Jan. 31, 1950 P. R. SCHROEPPEL 2,495,986
MOWING APPARATUS
Filed March 5, 1947
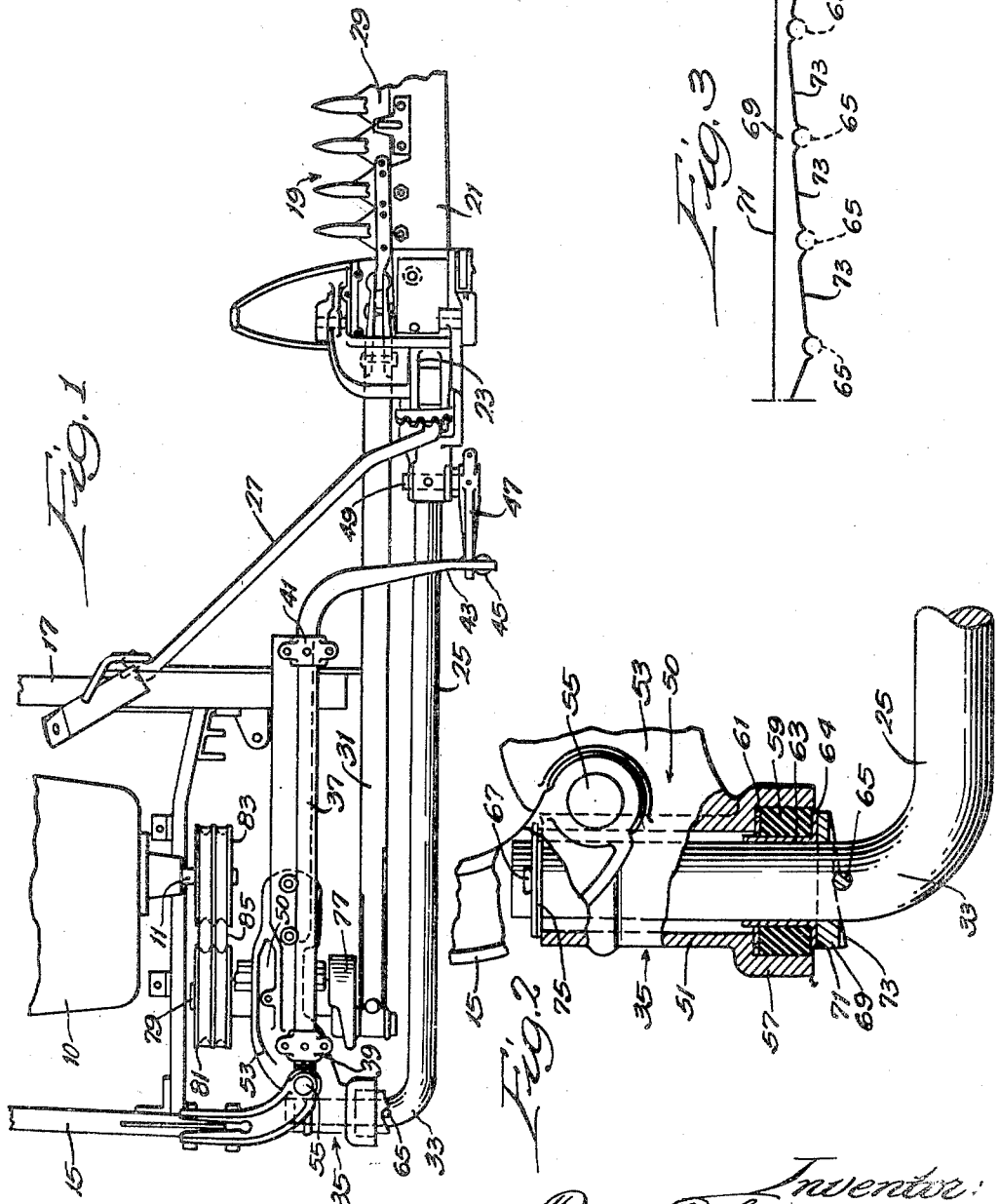
Inventor:
Paul R. Schroeppel,
By Soans, Pond & Anderson
Attorneys.

Patented Jan. 31, 1950

2,495,986

UNITED STATES PATENT OFFICE 2,495,986

MOWING APPARATUS

Paul R. Schroeppel, Rockford, Ill., assignor to J. I. Case Company, Racine, Wis., a corporation of Wisconsin Application March 5, 1947, Serial No. 732,450

2 Claims. (Cl. 56—25)

The present invention relates to mowing apparatus and, in particular, to a vibration dampening cutter bar support especially adapted for use on a tractor-operated mowing machine.

In the usual tractor-operated mowing machine, the mower cutter bar and the support members for the cutter bar are connected directly to the frame of the tractor by means of suitable support brackets; and thus, vibrations from the rapidly reciprocating sickle element of the cutter bar are transmitted to the frame of the tractor through the supporting members and brackets. The inherent vibrations of the sickle bar cause undesirable fatigue of the operator and inefficient labor results. The vibrations also cause strains in the structural members which must be especially constructed so as to avoid fatigue failure or crystallization. The vibrations from the sickle and the shocks resulting from the cutter bar striking obstructions in the field during operation have the further undesirable result of causing extensive wear in the machine bearings, and, after a period of time, this wear results in a loose cutter bar which may become displaced from its normal operating position. When the cutter bar deviates from this position which is substantially normal to the line of travel of the tractor, excessive strains are produced in the connecting mechanical linkage and the efficiency of the cutter bar is reduced.

The principal object of the present invention is to provide an improved support for a tractor-operated mower, which acts to dampen the vibrations resulting from the sickle bar operation. Another object of the invention is to provide a resilient support which reduces, to a minimum, the transmission of shock from the cutter bar to the frame members when the cutter bar strikes an obstruction in the field. A further object of the invention is to provide a support having an adjusting means for maintaining the cutter bar in proper operating position, substantially normal to the line of the tractor. Other objects and advantages will be apparent by reference to the following description and the accompanying drawing.

In the drawing,

Fig. 1 is a plan view of the supporting and operating members of a tractor mounted mower embodying the features of the improved supporting means of my invention;

Fig. 2 is an enlarged plan view, partially in section, of the vibration dampening supporting means of the invention; and Fig. 3 is a surface development of the periphery of the adjusting collar constituting a part of the supporting means illustrated more completely in Figure 2.

The moving machine illustrated in the drawings is adapted to be supported upon the frame of a conventional tractor 10 by means of structural members 15 and 17. The mowing machine is driven from the tractor power take-off shaft, indicated at 11. The cutting mechanism 19 is of conventional construction and comprises a cutter bar 21 supported on a cutter bar head 23, which is connected to the tractor frame by means of a drag bar 25 and a pull bar 27. An elevation linkage, which is hereinafter described, is associated with these parts in the conventional manner to facilitate moving the cutter bar from its horizontal operative position to its elevated transport position.

The cutter bar 21 includes the usual reciprocating sickle 29 which is driven by means of a conventional pitman 31. The drag bar 25 is attached, at its outer end, to the cutter bar head 23 in the usual manner, and the inner end is bent at right angles to form an L-shaped portion 33 which is secured to the drag bar support 35 by the improved means of the present invention.

The cutter bar elevating means comprises a rocker shaft 37 mounted in bearings 39 and 41 attached to the frame structure of the cutter bar. An arm 43 is integrally attached to one end of the shaft 37 and this arm is connected by a suitable linkage 45 to a bell crank lever 47 mounted on a stub shaft 49. The stub shaft 49 is connected by suitable link mechanism to the cutter bar. A forwardly extending operating arm (not shown) similar to the arm 43 is attached to the other end of the rocker shaft. The operating arm may be connected by a linkage to a foot pedal or hand lever mounted on the tractor frame in conventional manner. Movement of the operating arm effects the swinging of the cutter bar 21 from its horizontal operative position as shown in the drawings to its elevated transport position. The conventional horizontal pivotal movement of the cutter bar is also allowed when the cutting mechanism strikes a large obstruction in the field. This safety means is the usual well known connection that is commonly used in cutting mechanisms of this type.

The improved drag bar supporting means of my invention includes a main support casting 50 which comprises a hollow cylindrical section 51 adapted to fit loosely around the drag bar 25 and a horizontally disposed web section 53 for supporting the lifting means and the sickle operating mechanism. The main support casting 50 is pivotally connected to the frame extension 15 by means of a vertical mounting pin 55, as shown in Figure 2.

As before stated, the hollow cylindrical portion 51 of the casting 50 has a diameter which is substantially larger than the diameter of the drag bar 25. At the rear section of the cylindrical portion 51, an enlarged section 57 is provided which is adapted to receive a resilient cushioning ring 59. This construction of the cylindrical portion 51 provides an annular shoulder or seat therein which registers with the resilient cushioning ring 59. The ring 59 may be fabricated from a suitable material, such as rubber. Metal protecting inserts 61 and 63 are provided to protect the cushioning ring 59 from abrasion and tearing. One insert 63 is collar shaped and includes a tubular body portion and a flanged end portion 64. The inner diameter of the tubular body portion is slightly larger than the drag bar 25 and allows a sliding fit. The flanged end portion 64 has an outer diameter that is smaller than the diameter of the enlarged portion 57 of the casting 50. The other protecting insert 61 is washer-shaped and is adapted to fit loosely around the tubular body portion of the collar shaped insert 63.

The protective inserts 61 and 63 and the resilient cushioning ring 59 are assembled into a spool-like element which is adapted to be placed in the enlarged portion 57 of the casting 50 as shown in the drawing. The L-shaped portion 33 of the drag bar 25 is provided with a bearing pin 65 and a removable retaining pin 67. Bearing means which comprises an adjusting ring 69 having a plane face 71 is provided for engaging the flanged end portion 64 of the insert 63. The other face of the ring 69 comprises a cam surface 73 which is provided with indentations about the periphery thereof adapted to engage the bearing pin 65 on the drag bar. The drag bar 25 is mounted in the hollow portion 51 of the casting 50 by passing the L-shaped portion 33 through the adjusting collar 71 and the spool shaped cushioning means until the bearing pin 65 engages the cam surface 73 of the adjusting ring 69. Retaining means are provided for preventing withdrawal of the drag bar from the casting. These means include retaining washers 75 which are placed over the end of the drag bar 25 and the retaining pin 67 which is placed in the hole provided therefor.

The webbed portion 53 of the casting 50 is adapted to support the adjusting linkage rocker shaft 37 and the sickle drive means. As previously described, the power for operating the mower is obtained from the power take-off 11 of the associated tractor, and the sickle bar 29 is driven by the pitman 31 which, in turn, is driven by a rotating pitman crank 77. A crank shaft 79 mounted on the web 53 is driven by the power take-off 11 through the medium of pulleys 81 and 83 and belts 85. It is advantageous, if maximum vibration dampening is desired, to mount the pitman crank 77 as far to the rear of the drag bar pivot pin 55 as is possible.

From the surface development of the periphery of the adjusting ring 69 shown in Fig. 3, it will be seen that by simply turning the ring 69 so that the bearing pin 65 engages a higher portion of the cam surface 73, the rubber ring 59 is compressed and the flexibility of the mounting is controlled. If in conjunction with this adjustment the thickness of the retaining washers 75 is reduced, the drag bar 25 will be pivoted about the cutter head 23 and pull bar 27 and the cutter bar 21 will be moved to a more forward position. Conversely, increasing the thickness of the retaining washers 75 will tend to move the cutter bar 21 to the rear. Thus, a simple adjustment results, which allows compensation for the wear on the connections between members 15 and 17 and cutter bar 21.

It is apparent that any longitudinal vibration resulting from operation of the cutter bar 19 and shocks such as will occur when the cutter bar 19 strikes an object in the field, will be absorbed by compression of the resilient ring 59 in a longitudinal direction. The rapidly reciprocating pitman drive 31 is so attached to the web portion 53 of the mounting 35 that the resultant of the transverse forces produced during the normal operation of the pitman drive 31 will act upon a line which passes to the rear of the mounting pin 55. Thus, a substantial portion of the pitman vibration is absorbed by the transverse compression of the cushioning ring. The outer diameter of the washer 61 and collar insert flange 64 is smaller than that of the enlarged portion 57 of the casting 50 so that the transverse vibrations will not result in metal-to-metal contact.

The present invention provides a support which is inexpensive to manufacture and maintain and which provides maximum vibration dampening. In addition to the vibration dampening features of the invention, an adjusting means is provided which simplifies compensation for bearing wear and allows accurate adjustment of the cutter bar without undue maintenance expense.

The features of the invention that are believed to be new are expressly set forth in the appended claims.

I claim:

1. In combination in apparatus of the class described a tractor and a cutting mechanism which includes a cutter bar, a cutter bar head for mounting said cutter bar, a forwardly extending pull bar and a drag bar which extends transversely of the line of draft of the tractor and has a forwardly extending portion for connecting said cutter bar head to said tractor, an abutment on said forwardly extending portion and resilient means for interconnecting said drag bar and said tractor, said resilient means including a pivotally mounted casting having a hollow cylindrical portion formed therein for receiving said forwardly extending portion of said drag bar, retaining means on said forwardly extending portion in engagement with said casting, a hollow resilient member embracing said forwardly extending portion which is yieldable both longitudinally and transversely, said resilient member being seated in said casting and being disposed between the walls of the hollow portion of the casting and the adjacent surfaces of the drag bar, and bearing means which includes an adjusting ring having a surface which abuts said resilient member and a cam surface which bears against said abutment on said drag bar and which is operable to determine the compressive force exerted upon said resilient member.

2. In mowing apparatus comprising a tractor, a cutting mechanism which extends outwardly from and transversely of said tractor, and means for supporting said cutting mechanism on said tractor including a cutter bar head for mounting said cutting mechanism, a pull bar which extends forwardly from said cutter bar head and which is connected at the forward end to said tractor, and a drag bar which extends transversely of said tractor, one end of said drag bar being connected to said cutter bar head, the other end of said drag bar being bent to provide a portion which extends forwardly longitudinally of said tractor, said bent portion being connected to said tractor by resilient means which comprises an elongated casting having a hollow receiving portion formed therein, said receiving portion being proportioned to fit loosely around the bent portion of said drag bar, said hollow receiving portion including an enlarged section and a section of reduced cross-sectional area whereby a shoulder is formed within said receiving portion, a retaining pin which is attached to said forwardly extending portion to prevent the withdrawal of said drag bar from said casting, a ring of resilient material which is proportioned to fit within said enlarged section of said casting and to fit around said drag bar, one face of said ring registering with said shoulder formed within said receiving portion, and an adjusting means which abuts the other face of said resilient ring, said adjusting means including an adjusting ring having a plane face which registers with said resilient ring and a cam face which has a plurality of indentations formed therein, and a bearing pin which extends through said drag bar and which is proportioned to engage the indentations which are formed in said cam surface.

PAUL R. SCHROEPPEL.

REFERENCES CITED

The following references are of record in the file of this patent:

UNITED STATES PATENTS

| Number | Name | Date |
| --- | --- | --- |
| Re. 21,636 | Pearson | Nov. 26, 1940 |
| 1,947,552 | Huddle | Feb. 20, 1934 |
| 1,955,544 | Huddle | Apr. 17, 1934 |
| 2,311,095 | Simpson et al. | Feb. 16, 1943 |
| 2,354,710 | Simpson et al. | Aug. 1, 1944 |